United States Patent [19]
Satoh et al.

[11] Patent Number: 6,051,526
[45] Date of Patent: *Apr. 18, 2000

[54] α-OLEFIN POLYMERIZATION CATALYST AND PROCESS FOR PRODUCING α-OLEFIN POLYMER

[75] Inventors: Makoto Satoh, Ichihara; Yasuki Fujiwara, Sodegaura; Akio Imai, Ichihara, all of Japan

[73] Assignee: Sumitomo Chemical Company, Limited, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/665,650

[22] Filed: Jun. 18, 1996

[30] Foreign Application Priority Data

Jun. 23, 1995 [JP] Japan .................................. 7-157954

[51] Int. Cl.[7] ................................................... B01J 31/00
[52] U.S. Cl. ........................ 502/127; 502/103; 502/117; 502/125; 502/126; 526/125.3; 526/128
[58] Field of Search .................................. 502/103, 117, 502/125, 126, 127; 526/125.3, 128

[56] References Cited

U.S. PATENT DOCUMENTS

| | | | |
|---|---|---|---|
| 4,619,981 | 10/1986 | Tajima et al. ............................. | 526/125 |
| 4,672,050 | 6/1987 | Sasaki et al. ............................. | 502/116 |
| 4,983,561 | 1/1991 | Sasaki et al. ............................. | 502/107 |
| 4,990,479 | 2/1991 | Ishimaru et al. ......................... | 502/125 |
| 5,354,820 | 10/1994 | Funabashi ................................. | 526/124 |
| 5,498,770 | 3/1996 | Hosaka et al. ........................... | 502/116 |

FOREIGN PATENT DOCUMENTS

| | | |
|---|---|---|
| 0268274 | 5/1988 | European Pat. Off. . |
| 0319913 | 6/1989 | European Pat. Off. . |
| 0376084 | 7/1990 | European Pat. Off. . |
| 0398698 | 11/1990 | European Pat. Off. . |
| 1319508 | 12/1989 | Japan . |
| 343283 | 7/1991 | Japan . |

*Primary Examiner*—David W. Wu
*Assistant Examiner*—Ling-Siu Choi
*Attorney, Agent, or Firm*—Stevens, Davis, Miller & Mosher, L.L.P.

[57] ABSTRACT

An α-olefin polymerization catalyst which comprises (A) a solid catalyst component obtained by treating a solid product obtained by contacting a compound having an M—O bond (M is the element of the 1st, 2nd, 13th and 14th Groups in the Periodic Table) with an organomagnesium compound in the presence of an electron donor, with an electron donor and successively a halide compound of metal of the 4th to 6th Groups in the Periodic Table, (B) an organoaluminum compound, and (C) an electron donative compound, and a process for producing an α-olefin polymer polymerizing an α-olefin with said catalyst.

1 Claim, 1 Drawing Sheet

иd# α-OLEFIN POLYMERIZATION CATALYST AND PROCESS FOR PRODUCING α-OLEFIN POLYMER

BACKGROUND OF THE INVENTION

1. Field of the Invention

The present invention relates to an α-olefin polymerization catalyst and a process for producing an α-olefin polymer. Particularly, the present invention relates to an α-olefin polymerization catalyst giving a highly stereoregular α-olefin polymer of high bulk density containing an extremely little catalyst residue and amorphous polymer and having excellent mechanical properties and processability, and having an extremely high catalytic activity per a solid catalyst and per a transition metal atom, and a process for producing a highly stereoregular α-olefin polymer of high bulk density with said catalyst.

2. Prior Art

As a process for producing the polymer of α-olefin such as propylene, butene-1 or the like, it is well known that the so-called Ziegler-Natta catalyst comprising the transition metal compound of the 4th to 6th Groups and the organometallic compound of the 1st, 2nd and 13th Groups in the Periodic Table is used.

In the production of α-olefin polymers, an amorphous polymer is formed as by-product in addition to a highly stereoregular α-olefin polymer having a high value in industrial application. This amorphous polymer has little value in industrial application and effects largely a bad influence on mechanical properties, when an α-olefin polymer is molded to a molded article, a film, a fiber and other fabricated goods to be used. The formation of the amorphous polymer causes the loss of a raw material monomer and at the same time, an apparatus for removing an amorphous polymer becomes necessary to cause an extremely large disadvantage from an industrial viewpoint. Therefore, it is necessary that a catalyst for producing an α-olefin polymer forms no amorphous polymer or forms rarely little.

In the α-olefin polymer obtained, a residue of catalyst comprising a transition metal compound and an organometallic compound remains. As this catalyst residue causes problems in the various points such as stability, processability and the like of the α-olefin polymer, an apparatus for removing the catalyst residue thereby stabilizing the polymer becomes necessary. As this defect can be improved by increase a catalyst activity represented by the weight of the α-olefin polymer produced per the unit weight of a catalyst, the above-mentioned apparatus for removing the catalyst residue becomes unnecessary and the reduction of the manufacturing cost of α-olefin polymer also becomes possible.

It is known that highly stereoregular and highly active polymerization of α-olefin can be realized to a certain extent by using a Ti—Mg complex type solid catalyst obtained by reducing a tetra-valent titanium compound with an organomagnesium compound in the presence of an organosilicon compound and forming the magnesium-titanium eutectic mixture, in combination with the organoaluminum compound of a promotor and the organosilicon compound as a third component in polymerization. (Japanese Patent Publication (Examined) Nos. Hei 3-43283(1991), Hei 1-319508 (1989))

In any case, a non-extraction and non-deashing process is in a possible level, but furthermore, a more improvement is desired. In the concrete, in order to produce an α-olefin polymer of high quality, the realization of further highly stereoregular polymerization without sacrificing a particle size distribution and the like is desired. Particularly, in a use such as a field for molding wherein it is desired to make a polymer be in high rigidity, a highly stereoregular polymer brings directly out the quality of a high rigidity, and therefore, the appearance of a catalyst having a further highly stereoregular polymerizability, a high bulk density and a narrow particle size distribution is acutely desired.

SUMMARY OF THE INVENTION

An object of the present invention is to provide an α-olefin polymerization catalyst having a narrow particle size distribution and a high catalytic activity enough to be unnecessary for removing a catalyst residue and an amorphous polymer and giving an α-olefin polymer of high stereoregularity, and a process for producing an α-olefin polymer having a high bulk density and stereoregularity.

The present invention provides an α-olefin polymerization catalyst comprising:

(A) a solid catalyst component obtained by treating a solid product obtained by contacting a compound having an M—O bond (M is the element of the 1st, 2nd, 13th or 14th Group in the Periodic Table) with an organomagnesium compound in the presence of an electron donor, with an electron donor and successively a halide compound of metal belonging to the 4th to 6th Groups in the Periodic Table, (B) an organoaluminum compound; and (C) an electron donative compound, and a process for producing an α-olefin polymer polymerizing an α-olefin with said catalyst.

By using the present catalyst, the fore-mentioned object and particularly, the highly stereoregular polymerization of an α-olefin is attained and at the same time, a process for producing a high bulk density and highly stereo-regular α-olefin polymer can be provided. The present invention is illustrated in the concrete as follows.

Figure 1:
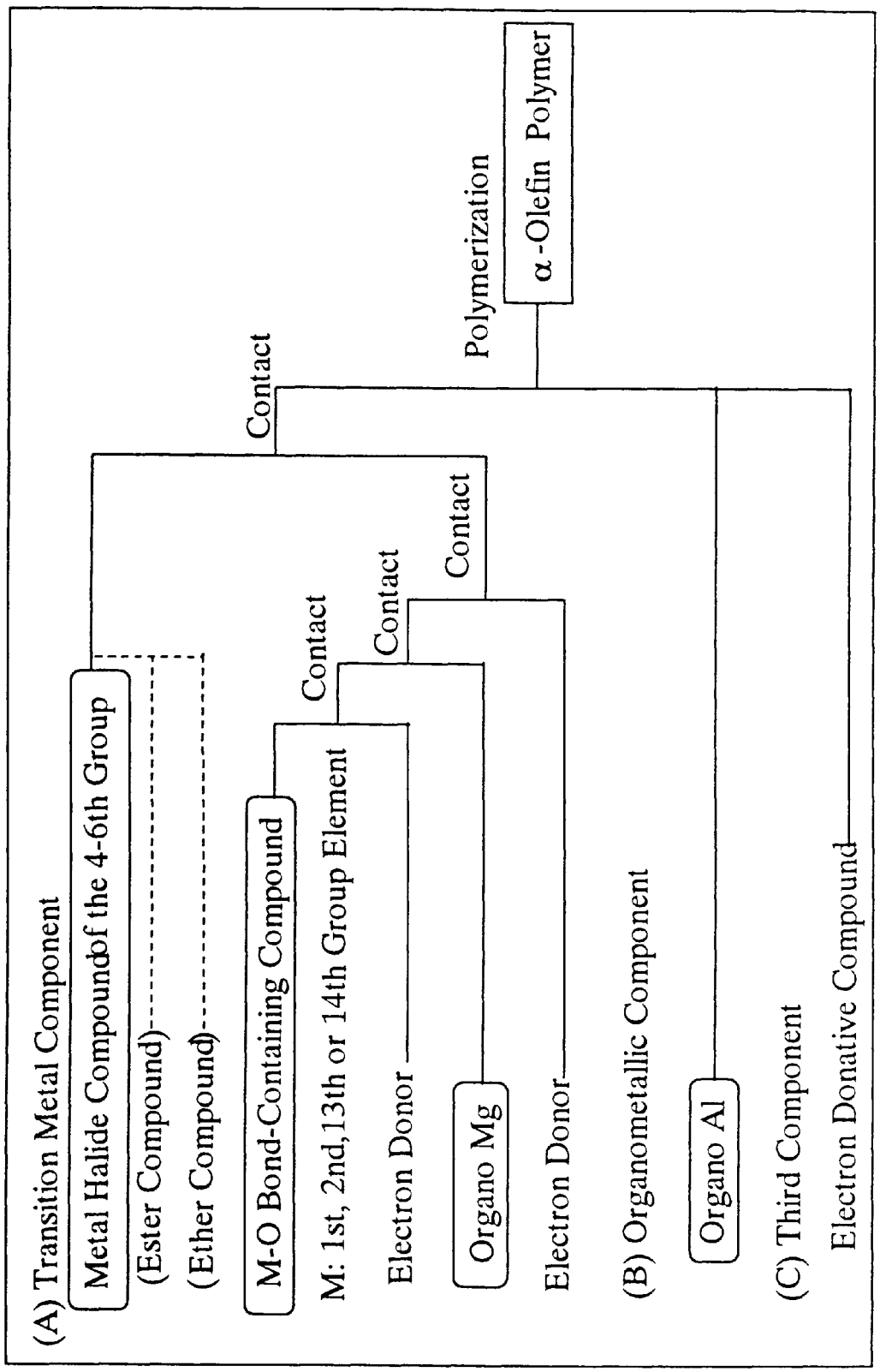
FIG. 1 is a flow-chart for facilitating the understanding of the present invention. The flow-chart is a representative of embodiments of the present invention.

DETAILED DESCRIPTION OF THE INVENTION (a) Compound having M—O bond

As the compound having an M—O bond (M is the element of the 1st, 2nd, 13th or 14th Group in the Periodic Table), there is used a compound having a bond of lithium, sodium, potassium, beryllium, magnesium, calcium, boron, aluminum, gallium, carbon, silicon, germanium or tin with oxygen. Particularly, a compound having a bond of boron, aluminum, carbon or silicon with oxygen is preferably used and furthermore, an organosilicon compound having an Si—O bond is more preferably used.

Examples of the organosilicon compound having an Si—O bond in its molecule used in the synthesis of the solid catalyst component in the present invention, include the ones represented by the following general formulae:

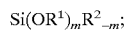

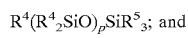

wherein $R^2$ is a hydrocarbon group having 1 to 20 carbon atoms, each $R^2$, $R^3$, $R^4$, $R^5$ and $R^6$ is a hydrocarbon group having 1 to 20 carbon atoms or a hydrogen atom, m is a number satisfying $0<m\leq 4$, p is an integer of 1 to 1000 and q is an integer of 2 to 1000.

The examples of the organosilicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, phenylhydropolysiloxane and the like.

Among these organosilicon compounds, alkoxysilane compounds represented by the following general formula $Si(OR^1)_m R^2_{4-m}$ are preferred, $2\leq m\leq 4$ is preferred and particularly, tetraalkoxysilane compounds of m=4 are preferred.

(b) Electron donor

As the electron donor used in the present invention, there can be illustrated electron donors containing oxygen such as alcohols, phenols, ethers, ketones, aldehydes, carboxylic acids, esters of organic acids and inorganic acids, acid amides, acid anhydrides and the like; electron donors containing nitrogen such as ammonias, amines, nitriles, isocyanates and the like; and the like. Among these electron donors, esters of organic acids are preferably used.

These esters of organic acids include mono- and polyvalent carboxylates, and examples of these include saturated aliphatic carboxylates, unsaturated aliphatic carboxylates, alicyclic carboxylates and aromatic carboxylates. Concrete examples include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl methoxybenzoate, diethyl succinate, dibutyl succinate, diethylmalonate, dibutyl malonate, dimethyl maleate, dibutyl maleate, diethyl itaconate, dibutyl itaconate, monoethyl phthalate, dimethyl phthalate, methylethyl phthalate, diethylphthalate, di-n-propyl phthalate, diisopropyl phthalate, di-n-butyl phthalate, diisobutyl phthalate, di-n-octyl phthalate, diphenyl phthalate and the like. Among these ester compounds, unsaturated aliphatic carboxylates such as a methacrylate, a maleate and the like and phthalates are preferred, and diesters of phthalic acid are particularly preferred.

(c) Organomagnesium compound

As the organomagnesium compound used in the present invention, any organomagnesium compounds having an Mg-carbon bond in its molecule can be used. Particularly, a Grignard compound represented by the general formula $R^8MgX$ (wherein $R^8$ represents a hydrocarbon group having 1 to 20 carbon atoms and X represents a halogen) and a dialkyl magnesium compound or a diaryl magnesium compound represented by the general formula $R^9R^{10}Mg$ (wherein each $R^9$ and $R^{10}$ represents a hydrocarbon group having 1 to 20 carbon atoms) are preferably used. $R^8$, $R^9$ and $R^{10}$ may be the same or different and represent an alkyl, aryl, aralkyl or alkenyl group having up to 20 carbon atoms such as methyl, ethyl, propyl, isopropyl, butyl, sec-butyl, amyl, isoamyl, hexyl, octyl, 2-ethylhexyl, phenyl, benzyl or the like.

Examples of the Grignard compound include methylmagnesium chloride, ethylmagnesium chloride, ethylmagnesium bromide, ethylmagnesium iodide, propylmagnesium chloride, propylmagnesium bromide, butylmagnesiumchloride, butylmagnesium bromide, sec-butylmagnesium chloride, sec-butylmagnesium bromide, t-butylmagnesium chloride, t-butylmagnesium bromide, amylmagnesium chloride, isoamylmagnesium chloride hexylmagnesium chloride, phenylmagnesium chloride, phenylmagnesium bromide and the like, and the compounds represented by the general formula $R^9R^{10}Mg$ include dimethylmagnesium, diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, dihexylmagnesium, diphenylmagnesium, butylethylmagnesium and the like.

As a solvent for synthesizing the above organomagnesium compound, an ether solvent such as diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran or the like can be used. A hydrocarbon solvent such as hexane, heptane, octane, cyclohexane, methylcyclohexane, benzene, toluene, xylene or the like, or a mixed solvent of the ether and the hydrocarbon may be used.

It is preferred to use the organomagnesium compound in the state of an ether solution, and as the ether, an ether compound having 6 or more carbon atoms in its molecule or a cyclic ether compound is used. The Grignard compound represented by the general formula $R^8MgX$ is preferably used in the state of an ether solution from the view point of ability of the catalyst to be obtained. Further, the complex of the above-mentioned organomagnesium compound and an organometallic compound soluble in a hydrocarbon can be used. Examples of such organometallic compound include organic compounds of Li, Be, B, Al and Zn.

(d) Metal halide compound

The metal halide compound used in the present invention is the halide compound of metal belonging to the 4th to 6th Groups in the Periodic Table. The halide compound of at least one transition metal selected from Ti, Zr and Hf is preferred. Particularly, the halide compound of tetra-valent titanium is preferably used.

As the halide compound of tetra-valent titanium, compounds represented by the general formula $Ti(OR^{11})_g X_{4-g}$ ($R^{11}$ is a hydrocarbon group having 1 to 20 carbon atoms, X is a halogen atom and g is a number satisfying $0\leq g<4$) can be illustrated.

Examples of the titanium halide compound include titanium tetrahalides such as $TiCl_4$, $TiBr_4$, $TiI_4$ and the like; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$, $Ti(O-iso-C_4H_9)Br_3$ and the like; dialkoxytitanium dihalides such as $Ti(OCH_3)_2Cl_2$, $Ti(OC_2H_5)_2Cl_2$, $Ti(O-n-C_4H_9)_2Cl_2$, $Ti(OC_2H_5)_2Br_2$ and the like; trialkoxytitanium monohalides such as $Ti(OCH_3)_3Cl$, $Ti(OC_2H_5)_3Cl$, $Ti(O-n-C_4H_9)_3Cl_2$, $Ti(OC_2H_5)_3Br$ and the like; and the like. Among these, titanium tetrahalides are preferred and titanium tetrachloride is particularly preferred. These titanium compounds may be used alone or in combination of two or more thereof.

The metal halide compound in the present invention can be used as a mixture with an ether compound or a mixture with an ether compound and an ester compound.

Examples of the ether compound include dialkyl ethers such as diethyl ether, dipropyl ether, diisopropyl ether, di-n-butyl ether, diisobutyl ether, diamyl ether, diisoamyl ether, dineopenyl ether, dihexyl ether, dioctyl ether, methylbutyl ether, methylisoamyl ether, ethylisobutyl ether and the like. Among these, di-n-butyl ether and diisoamyl ether are particularly preferred.

As the ester compound, there can be used esters of organic acid described above.

(e) Synthesis of solid catalyst

The solid catalyst of the present invention is synthesized by treating a solid product obtained by contacting a compound having an M—O bond (M is the element of the 1st, 2nd, 13th or 14th Group in the Periodic Table)(a) with an organomagnesium compound in the presence of an electron donor (b), with an electron donor (b) and successively a halide compound (d) of metal belonging to the 4th to 6th Groups in the Periodic Table. All these synthetic reactions are conducted under the atmosphere of an inert gas such as nitrogen, argon or the like.

The contact of the organomagnesium compound (c) may be carried out by either adding (c) to the mixture of (a) and (b), or inversely adding the mixture of (a) and (b) to the solution of (c). The addition of (c) to the mixture of (a) and (b) is preferred from the viewpoint of the catalytic activity.

(a) and (b) are preferably used as dissolved or diluted in an appropriate solvent. Examples of the solvent include aliphatic hydrocarbons such as hexane, heptane, octane, decane and the like; aromatic hydrocarbons such as toluene, xylene and the like; alicyclic hydrocarbons such as cyclohexane, methylcyclohexane, decalin and the like; ether compounds such as diethyl ether, dibutyl ether, diisoamyl ether, tetrahydrofuran and the like.

The contact temperature is usually −50 to 70° C., preferably −30 to 50° C. and particularly preferably −25 to 35° C. When the contact temperature is too high, the catalyst activity becomes low.

When the solid product is synthesized by the contact reaction, it is also possible to let a porous material of an inorganic oxide, an organic polymer or the like coexist and to impregnate the solid product in a porous material. As such porous material, the one having a micropore volume of 0.3 ml/g or more in a micropore radius of 20 to 200 nm and having an average particle diameter of 5 to 300 $\mu$m, is preferred.

Examples of the porous inorganic oxide include $SiO_2$, $Al_2O_3$, MgO, $TiO_2$, $ZrO_2$, $SiO_2.Al_2O_3$ complex oxide, $MgO.Al_2O_3$ complex oxide, $MgO.SiO_2.Al_2O_3$ complex oxide and the like. Examples of the porous polymer include styrenic polymers, polyacrylates, polymethacrylates, polyacrylonitriles, vinyl chloride polymers and polyolefins represented by polystyrene, styrene-divinylbenzene copolymer, a styrene-N,N'-alkylene dimethacrylamide copolymer, styrene-ethyleneglycoldimethyl methacrylate copolymer, polyethyl acrylate, methyl acrylate-divinylbenzene copolymer, ethyl acrylate-divinylbenzene copolymer, polymethyl methacrylate, methyl methacrylate-divinylbenzene copolymer, polyethyleneglycoldimethyl methacrylate, polyacrylonitrile, acrylonitrile-divinylbenzene copolymer, polyvinyl chloride, polyvinyl pyrrolidine, polyvinyl pyridine, ethylvinylbenzene-divinylbenzene copolymer, polyethylene, ethylene-methyl acrylate copolymer, polypropylene and the like.

Among these porous materials, $SiO_2$, $Al_2O_3$ and styrene-divinylbenzene copolymer are preferably used.

The dropwise addition time is not specifically restricted and is usually about 30 minutes to 12 hours. Further, the post reaction may be carried out at a temperature of 20 to 120° C.

The amount of the electron donor (b) used in the synthesis of the solid product is preferably 0.001 to 1, more preferably 0.005 to 0.6 and particularly preferably 0.01 to 0.3 in the molar ratio of (b) to magnesium ((b)/Mg). Furthermore, the amount of the organomagnesium compound used is preferably 0.1 to 10, more preferably 0.2 to 5.0 and particularly preferably 0.5 to 2.0 in the atomic ratio of the M atom of the compound having an M—O bond to a magnesium atom (M atom/Mg).

The solid product obtained by the contact reaction is subjected to solid-liquid separation and washed several times with an inert hydrocarbon solvent such as hexane, heptane or the like. The solid product thus obtained contains magnesium and a hydrocarbyloxy group, and indicates usually a non-crystallinity or an extremely low crystallinity. From the viewpoint of the catalyst ability, the solid product having an amorphous structure is particularly preferred.

Next, the solid product obtained by the above method is further treated with the electron donor (b). The amount of (b) used in this treatment is 0.01 to 1.0 mol and preferably 0.03 to 0.5 mol per 1 mol of a magnesium atom in the solid product. When the amount of the ester compound is excessively much, the particles intend to degradation.

The treatment of the solid product with (b) can be carried out by any of well-known methods capable of contacting the solid product with (b) such as a slurry method or a mechanical pulverization means by a ball-mill or the like. However, when the mechanical pulverization is applied, finely ground particles from the solid catalyst component are formed in a large amount, and the particle size distribution becomes broad, and it is not preferable from the industrial point of view, and it is preferred to contact both in the presence of a diluent.

As the diluent, aliphatic hydrocarbons such as pentane, hexane, heptane, octane or the like, aromatic hydrocarbons such as benzene, toluene, xylene or the like, alicyclic hydrocarbons such as cyclohexane, cyclopentane or the like, halogenated hydrocarbons such as 1,2-dichloroethane, monochlorobenzene or the like can be used. Among these, aromatic hydrocarbons and halogenated hydrocarbons are particularly preferred.

The amount of the diluent used is preferably 0.1 ml to 1000 ml and more preferably 1 ml to 100 ml per 1 g of the solid product. The treatment temperature is preferably −50 to 150° C. and more preferably 0 to 120°0 C. The treatment time is preferably 5 minutes or more and more preferably 15 minutes to 3 hours. After completion of the treatment, the treated solid is allowed to stand to separate the solid from the liquid and successively, washed several times with an inert solvent to obtain the solid treated with the electron donative compound.

Next, the electron donor-treated solid is treated with a mixture of an ether compound and a metal halide compound (d) or a mixture of an ether compound, an ester compound and the metal halide compound (d). This treatment is preferably carried out in the state of slurry. The solvent used for slurring includes aliphatic hydrocarbons such as pentane, hexane, heptane, octane, decane and the like, aromatic hydrocarbons such as toluene, xylene and the like, alicyclic hydrocarbon such as cyclohexane, methylcyclohexane, decalin, halogenated hydrocarbons such as dichloroethane, trichloroethylene, monochlorobenzene, dichlorobenzene, trichlorobenzene and the like. Among these, halogenated hydrocarbons and aromatic hydrocarbons are preferred.

The slurry concentration is preferably 0.05 to 0.7 g solid/ml-solvent and more preferably 0.1 to 0.5 g solid/ml-solvent. The reaction temperature is preferably 30 to 150°

C., more preferably 45 to 135° C. and particularly preferably 60 to 120° C. The reaction time is particularly not restricted. However, a period of about 30 minutes to 6 hours is usually preferred.

In the treatment of the electron donor-treated solid with the mixture of the ether compound and the metal halide compound (d), as the method feeding the electron donor-treated solid, the ether compound and (d), either of a method adding the ether compound and (d) to the electron donor-treated solid, or a method inversely adding the electron donor-treated solid to the solution of the ether compound and (d) may be effected. In the method adding the ether compound and (d) to the electron donor-treated solid, a method adding (d) after adding the ether compound, or a method adding the ether compound and (d) at the same time is preferred, and particularly, a method adding the mixture of the ether compound and (d) previously prepared to the electron donor-treated solid is preferred.

The reaction of the electron donor-treated solid with the ether compound and (d) may be repeated twice or more. From the view point of catalytic activity and stereoregularity, it is preferable to repeat at least two times the reaction with the mixture of the ether compound and (d).

The amount of the ether compound used is preferably 0.008 to 80 mmol, more preferably 0.040 to 40 mmol and particularly preferably 0.08 to 16 mmol per 1 g of the solid product. The amount of (d) added is preferably 0.10 to 900 mmol, more preferably 0.3 to 450 mmol and particularly preferably 0.9 to 270 mmol per 1 g of the solid product. The amount of (d) added per 1 mol of the ether compound is preferably 1 to 100 mol, more preferably 1.5 to 75 mol and particularly preferably 2 to 50 mol.

In the treatment of the electron donor-treated solid with the mixture of the ether compound and (d), the amount of an ester compound used in case of the coexistence of the ester compound is preferably 30 mol or less, more preferably 15 mol or less and particularly preferably 5 mol or less per 1 mol of the metal atom belonging to the 4th to 6th Groups contained in the solid product.

The solid catalyst component obtained by the above-mentioned method is subjected to solid-liquid separation and successively, washed several times with an inert solvent such as hexane, heptane or the like to be used for polymerization. From the view point of catalytic activity and stereoregularity, it is preferable that after solid-liquid separation, the solid catalyst component was washed once or more at a temperature of 50 to 120° C. with a large amount of a halogenated hydrocarbon solvent such as monochlorobenzene or the like or an aromatic hydrocarbon solvent such as toluene or the like, then further washed several times with an aliphatic hydrocarbon solvent such as hexane or the like, and thereafter used in polymerization.

(f) Organoaluminum compound

The organoaluminum compound (b) used in the present invention has at least one Al-carbon bond in its molecule. The representatives thereof are organoaluminum compounds represented by the general formulae:

$R^{12}_\gamma AlY_{3-\gamma}$; and

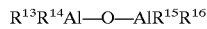

$R^{13}R^{14}Al-O-AlR^{15}R^{16}$ wherein $R^{12}$ to $R^{16}$ represent a hydrocarbon group having 1 to 20 carbon atoms, Y represents a halogen, hydrogen or an alkoxy group having 1 to 20 carbon atoms and γ is a number satisfying $2 \leq \gamma \leq 3$. Examples of the organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; dialkylaluminum halides such as diethylaluminum chloride and the like; mixtures of trialkylaluminums and dialkylaluminum halides such as a mixture of triethylaluminum and diethylaluminum chloride; alkylalumoxanes such as tetraethyldialumoxane, tetrabutyldialumoxane and the like. Among these organoaluminum compounds, trialkylaluminums, the mixtures of trialkylaluminums and dialkylaluminum halides and alkylalumoxanes are preferred, and particularly, triethylaluminum, triisobutylaluminum, the mixture of triethylaluminum and diethylaluminum chloride, and tetraethyldialumoxane are preferred.

The amount of the organoaluminum compound used can be selected in a wide range as 0.5 to 1000 mol per 1 mol of the metal atom belonging to the 4th to 6th Groups in the Periodic Table contained in the solid catalyst, and the range of 1 to 600 mol is particularly preferred.

(g) Electron donative compound

The electron donative compound (c) used in the polymerization in the present invention, include electron donative compounds containing oxygen such as alcohols, phenols, ketones, aldehydes, carboxylic acids, esters of organic acids and inorganic acids, ethers, acid amides, acid anhydrides and the like; electron donative compounds containing nitrogen such as ammonias, amines, nitrites, isocyanates and the like; and the like. Among these electron donative compounds, the ethers and the esters of inorganic acids are preferably used.

As esters of inorganic acids, an organosilicon compound represented by the general formula $R^{17}_n Si(OR^{18})_{4-n}$ (wherein $R^{17}$ is a hydrocarbon group having 1 to 20 carbons or hydrogen, $R^{18}$ is a hydrocarbon group having 1 to 20 carbons, $R^{17}$ and $R^{18}$ each may have a different substituted group in the same molecule, and n is $0 \leq n < 4$) can be mentioned. The examples include tetramethoxysilane, tetraethoxysilane, tetrabutoxysilane, tetraphenoxysilane, methyltrimethoxysilane, ethyltrimethoxysilane, butyltrimethoxysilane, isobutyltrimethoxysilane, tert-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane dibutyldimethoxysilane, diisobutyldimethoxysilane, di-tert-butyldimethoxysilane, butylmethyldimethoxysilane, butylethyldimethoxysilane, tert-butylmethyldimethoxysilane, isobutylisopropyldimethoxysilane, tert-butylisopropyldimethoxysilane, hexylmethyldimethoxysilane, hexylethyldimethoxysilane, dodecylmethyldimethoxysilane, dicyclopentyldimethoxysilane, cylcopentylmethyldimethoxysilane, cylcopentylethyldimethoxysilane, cylcopentylisopropyldimethoxysilane, cylcopentylisobutyldimethoxysilane, cylcopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tertbutyldimethoxysilane, phenylcylcopentyldimethoxysilane, vinylmethyldimethoxysilane, methyltriethoxysilane, ethyltriethoxysilane, butyltriethoxysilane, isobutyltriethoxysilane, tert-butyltriethoxysilane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, diisobutyldiethoxysilane, di-tert-butyldiethoxysilane, butylmethyldiethoxysilane, butylethyldiethoxysilane, t-butylmethyldiethoxysilane, hexylmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyltri-tert-butoxysilane, 2-norbornanetrimethoxysilane, 2-norbornanetriethoxysilane, 2-norbornanemethyldimethoxysilane, trimethylphenoxysilane, methyltriaryloxysilane and the like.

The ethers are preferably dialkyl ethers and diether compounds represented by the general formula:

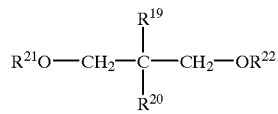

wherein $R^{19}$ to $R^{22}$ are independently a straight chain or branched chain alkyl, alicyclic, aryl, alkylaryl or arylalkyl group having up to 20 carbon atoms and $R^{19}$ or $R^{20}$ may be hydrogen.

The examples can include diethyl ether, dipropyl ether, diisopropyl ether, dibutyl ether, diamyl ether, diisoamyl ether, dineopenyl ether, dihexyl ether, dioctyl ether, methylbutyl ether, methylisoamyl ether, ethylisobutyl ether, 2,2-diisobutyl-1,3-dimethoxypropane, 2-isopropyl-2-isopentyl-1,3-dimethoxypropane, 2,2- bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane and the like.

Among these electron donative compounds (c), organosilicon compounds represented by the general formula $R^{23}R^{24}Si(OR^{25})_2$ are particularly preferred. (Wherein $R^{23}$ is a hydrocarbon group having 3 to 20 carbon atoms in which the carbon adjacent to Si is secondary or tertiary, and the example includes branched alkyl groups such as isopropyl, sec-butyl, t-butyl, tert-amyl and the like, cycloalkyl groups such as cyclopentyl, cyclohexyl and the like, cycloalkenyl groups such as cyclopentenyl and the like, aryl groups such as phenyl, tolyl and the like. $R^{24}$ is a hydrocarbon group having 1 to 20 carbon atoms and the example includes straight chain alkyl groups such as methyl, ethyl, propyl, butyl, pentyl and the like, branched alkyl groups such as isopropyl, sec-butyl, tert-butyl, tert-amyl and the like, cycloalkyl groups such as cyclopentyl, cyclohexyl and the like, cycloalkenyl groups such as cyclopentenyl and the like, aryl groups such as phenyl, tolyl and the like. $R^{25}$ is a hydrocarbon group having 1 to 20 carbon atoms and preferably a hydrocarbon group having 1 to 5 carbon atoms.

The example of the organosilicon compound used as electron donative compound (c) includes diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, isobutylisopropyldimethoxysilane, tert-butylisopropyldimethoxysilane, tert-butyl-n-butyldimethoxysilane, tert-butylisobutyldimethoxysilane, tert-butyl-sec-butyldimethoxysilane dicyclopentyldimethoxysilane, cylcopentylisopropyldimethoxysilane, cylcopentylisobutyldimethoxysilane, cylcopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcylcopentyldimethoxysilane, diisopropyldiethoxysilane, diisobutyldiethoxysilane, di-tert-butyldiethoxysilane, tert-butylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornanemethyldimethoxysilane and the like.

(h) Process for polymerizing olefin

The α-olefin applied to the present invention is an α-olefin having 3 or more carbon atoms and the examples include straight chain mono-olefins such as propylene, butene-1, pentene-1, hexene-1, heptene-1, octene-1, decene-1 and the like; branched mono-olefins such as 3-methylbutene-1, 3-methylpentene-1, 4-methylpentene-1 and the like; vinylcyclohexane and the like. These α-olefins may be used alone or in combination of two or more thereof. In other words, one α-olefin may be homopolymerized or a mixed α-olefins may be copolymerized. Among these α-olefins, it is preferred to homopolymerize propylene or butene-1 or copolymerize a mixed olefin comprising propylene as the main component and it is particularly preferred to homopolymerize propylene or copolymerize the mixed olefin comprising propylene as the main component. In the copolymerization of the present invention, the mixture of ethylene and at least one α-olefin selected from the above α-olefins can be used. Furthermore, it is possible to use a compound having two or more unsaturated bonds such as a conjugated diene and a non-conjugated diene in the copolymerization. A hetero-block copolymerization which comprises two or more polymerization steps can be easily carried out.

The feeding of each catalyst component to a polymerization vessel is not particularly restricted except feeding in the water-free state under an inert gas such as nitrogen, argon or the like.

The solid catalyst component (A), the organoaluminum compound (B) and the electron donative compound (C) may be fed separately or either two of them are previously contacted and then fed.

In the present invention, it is possible to polymerize olefins in the presence of the above-mentioned catalyst but the preliminary polymerization mentioned afterward may be performed before carrying out the above polymerization (hereinafter, referred to as "polymerization" or "main polymerization").

The preliminary polymerization is carried out in the presence of the solid catalyst component (A) and the organoaluminum compound (B) by feeding a small amount of an olefin and is preferred to carried out in the slurry state. As a solvent used for slurring, an inert hydrocarbon such as propane, butane, isobutane, pentane, isopentane, hexane, heptane, octane, cyclohexane, benzene or toluene can be used. In the formation of slurry, a part or the all part of the inert hydrocarbon may be replaced with a liquid olefin.

The amount of the organoaluminum compound used in the preliminary polymerization can be selected from wide range as from 0.5 to 700 mol per 1 mol of the metal atom belonging to the 4th to 6th Groups in the Periodic Table in the solid catalyst component, and the amount is preferably 0.8 to 500 mol, more preferably 1 to 200 mol per 1 mol of the metal atom belonging to the 4th to 6th Groups in the Periodic Table in the solid catalyst component. The amount of the olefin to be preliminary polymerized is 0.01 to 1000 g, preferably 0.05 to 500 g and particularly preferably 0.1 to 200 g per 1 g of the solid catalyst component.

The slurry concentration in the preliminary polymerization is preferably 1 to 500 g-the solid catalyst component/liter-solvent and particularly preferably 3 to 300 g-the solid catalyst component/liter-solvent. The temperature of the preliminary polymerization is preferably −20 to 100° C., more preferably 0 to 80° C. The partial pressure of the olefin in the gas phase in the preliminary polymerization is preferably 0.01 to 20 $kg/cm^2$ and particularly 0.1 to 10 $kg/cm^2$ is preferred, but this does not applied to the olefin being liquid at the pressure and temperature of the preliminary polymerization. Furthermore, the preliminary polymerization time is not particularly restricted and 2 minutes to 15 hours is usually preferred.

In carrying out the preliminary polymerization, the feeding of the solid catalyst component (A), the organoaluminum compound (B) and the olefin may be adopted either by a method for feeding the olefin after contacting the solid catalyst component (A) with the organoaluminum compound (B), or a method for feeding the organoaluminum compound (B) after contacting the solid catalyst component (A) with the olefin. The feeding of the olefin may be adopted either by a method for feeding the olefin in order while keeping a fixed pressure in the polymerization vessel, or by a method for feeding all of a predetermined amount of olefin at the start. A chain transfer agent such as hydrogen can be added in order to control the molecular weight of a polymer to be obtained.

Furthermore, in the preliminary polymerization of a small amount of the olefin in the presence of solid catalyst component (A) and the organoaluminum compound (B), the electron donative compound (C) may, if necessary, coexist. The electron donative compound used is a part or the all part of the above-mentioned electron donative compound (c). The amount used is preferably 0.01 to 400 mol, more preferably 0.02 to 200 mol and particularly preferably 0.03 to 100 mol per 1 mol of the metal atom belonging to the 4th to 6th Groups in the Periodic Table contained in the solid catalyst component (A), and preferably 0.003 to 5 mol, more preferably 0.005 to 3 mol and particularly preferably 0.01 to 2 mol per the organoaluminum compound (B).

The feeding method of the electron donative compound (C) in the preliminary polymerization is not particularly restricted. It may be fed separately from the organoaluminum compound (B) and after contacting with the organoaluminum compound (B), it may be fed. The olefin used in the preliminary polymerization may be the same or different from the olefin used in the main polymerization.

After the preliminary polymerization was carried out as mentioned above, or without performing the preliminary polymerization, the main polymerization of α-olefins can be carried out in the presence of the α-olefin polymerization catalyst comprising the above-mentioned solid catalyst component (A), the organoaluminum compound (B), and the electron donative compound (C).

The amount of the organoaluminum compound used in the main polymerization can be selected from such a wide range as from 1 to 1000 mol per 1 mol of the metal atom belonging to the 4th to 6th Groups in the Periodic Table contained in the solid catalyst component (A), and the range of 5 to 600 mol per 1 mol of the metal atom belonging to the 4th to 6th Groups in the Periodic Table contained in the solid catalyst component (A) is particularly preferred.

The amount of the electron donative compound (C) used in the main polymerization is preferably 0.1 to 2000 mol, more preferably 0.3 to 1000 mol and particularly preferably 0.5 to 800 mol per 1 mol of the metal atom belonging to the 4th to 6th Groups in the Periodic Table contained in the solid catalyst component (A), and preferably 0.001 to 5 mol, more preferably 0.005 to 3 mol and particularly preferably 0.01 to 1 mol per the organoaluminum compound (B).

The main polymerization can be carried out at a temperature of −30 to 300° C. and preferably 20 to 180° C. There is particularly no restriction on the polymerization pressure. However, from industrial and economical viewpoints, the pressure is preferably a normal pressure to 100 $kg/cm^2$ and more preferably about 2 to 50 $kg/cm^2$. As the polymerization form, either of a batchwise polymerization and a continuous polymerization are possible. A slurry polymerization or a solution polymerization in an inert hydrocarbon such as propane, butane, isobutane, pentane, hexane, heptane or octane, a bulk polymerization in which liquid olefins at the polymerization temperature is used as a medium, or a gas phase polymerization may be adopted.

In the main polymerization, it is possible to add a chain transfer agent such as hydrogen or the like in order to control the molecular weight of the polymer to be produced.

EXAMPLE

The present invention is illustrated in detail by Examples and Comparative Examples as follows but the present invention is not limited thereto. The methods for evaluating various material properties of the polymer in Examples are as follows.

The xylene-soluble part at 20° C. (hereinafter, abbreviated as "CXS"): After dissolving perfectly 1 g of the polymerization powder in 200 ml of boiling xylene, it was slowly cooled to 50° C. and successively, cooled to 20° C. with ice water under stirring. After allowed to stand for 3 hours at 20° C., the polymer precipitated is separated by filtration. Xylene is evaporated from the filtrate followed by drying under vacuum at 60° C. and a polymer soluble in xylene at 20° C. is recovered and weighed to determine % by weight to the weight of the total polymer. When the value of CXS is the smaller, an amorphous polymer is the less and it indicates a high stereoregularity.

Example 1

(a) Synthesis of solid product

After a 500 ml flask equipped with a stirrer and a dropping funnel was substituted with nitrogen, 290 ml of hexane, 2.5 ml (2.6 g, 9.3 mmol) of diisobutyl phthalate and 78.0 ml (72.9 g, 349 mmol) of tetraethoxysilane were thrown in to obtain a homogeneous solution. Next, while keeping a temperature in the flask at 5° C., 181 ml of di-n-butyl ether solution of n-butylmagnesium chloride (manufactured by Yuki Gosei Yakuhin Company Ltd., the concentration of n-butylmagnesium chloride of 2.1 mmol/ml) was gradually dropped in for 4.3 hours from the dropping funnel. After dropping, it was further stirred for 1 hour at 5° C. and successively, further stirred for 1 hour at room temperature. After the resulting mixture was subjected to solid-liquid separation and washed repeatedly three times with 180 ml of toluene, 155 ml of toluene was added. When a part of the solid product slurry was sampled and composition analysis was performed, no phthalate was detected and the ethoxy group of 32.6% by weight and the butoxy group of 0.42% by weight were contained in the solid product. The slurry concentration was 0.172 g/ml.

(b) Synthesis of solid treated with ester

After a 50 ml flask equipped with a stirrer, a dropping funnel and a thermometer was substituted with nitrogen, 25 ml of the slurry containing the solid product obtained by the above (a) was thrown in, furthermore, the temperature was elevated to 105° C. and the slurry was stirred for 30 minutes. Next, 3.35 ml (12.5 mmol) of diisobutyl phthalate was added and reacted at 105° C. for 30 minutes. After the reaction, the reaction mixture was subjected to solid-liquid separation and washed twice with 25 ml of toluene.

(c) Synthesis of solid catalyst component (activating treatment)

After the washing in the above (b), 7.0 ml of toluene, 0.28 ml(1.05 mmol) of diisobutyl phthalate, 0.5 ml(2.96 mmol) of di-n-butyl ether and 8.0 ml(0.073 mol) of titanium tetrachloride were added to the flask and reacted for 3 hours at 105° C. After completion of the reaction, it was separated at the same temperature by solid-liquid separation and successively, washed twice by 30 ml of toluene at the same temperature. Next, 7.0 ml of toluene, 0.5 ml(2.96 mmol) of di-n-butyl ether and 4.0 ml(0.037 mol) of titanium tetrachloride were added and reacted for 1 hour at 105° C.

After the end of the reaction, the resulting mixture was subjected to solid-liquid separation at the same temperature and successively, washed three times with 25 ml of toluene at the same temperature, and then washed three times with 25 ml of hexane and dried under vacuum to obtain 4.6 g of the solid catalyst component.

In the solid catalyst component, the titanium atom of 1.67% by weight, the phthalate of 9.10% by weight, the ethoxy group of 0.65% by weight, the butoxy group of 0.14% by weight were contained. When the solid catalyst component was observed by a microscope, it had an excellent particle property having no fine particle.

(d) Polymerization of propylene

A 3-liter stirring type stainless autoclave was substituted with argon, and 2.6 mmol of triethylaluminum, 0.26 mmol of cyclohexylethyldimethoxysilane and 7.9 mg of the solid catalyst component synthesized in (c) were fed and hydrogen corresponding to a partial pressure of 0.33 kg/cm$^2$ was added. Subsequently, 780 g of liquid propylene was fed, the temperature of the autoclave was elevated to 80° C. and the polymerization was performed for 1 hour at 80° C. After the polymerization, an unreacted monomer was purged. The polymer produced was dried under vacuum for 2 hours at 60° C. to obtain 333.6 g of the polypropylene powder. Therefore, the yield of the polypropylene per 1 g of the solid catalyst component (hereinafter, abbreviated as PP/Cat) was 42,200 (g/g). The Xylene-soluble part at 20° C. occupying in the total yield (CXS) was 0.74 (wt %), the bulk density of the polymer was 0.40 (g/ml).

Comparative Example 1

(a) Synthesis of solid product

After a 500 ml flask equipped with a stirrer and a dropping funnel was substituted with nitrogen, 240 ml of hexane, and 69.4 ml(64.8 g, 311 mmol) of tetraethoxysilane were thrown in to obtain a homogeneous solution. Next, while keeping a temperature in the flask at 5° C., 181 ml of di-n-butyl ether solution of n-butylmagnesium chloride was gradually dropped into the flask taking 4.3 hours from the dropping funnel. After the dropping, it was further stirred for 1 hour at 5° C. and successively, further stirred for 1 hour at room temperature. After the resulting mixture was subjected to solid-liquid separation and washed repeatedly three times with 300 ml of hexane and three times with 300 ml of toluene, 250 ml of toluene was added. In this solid product slurry, ethoxy group of 35.9% by weight and butoxy group of 0.39% by weight were contained. The slurry concentration was 0.117 g/ml.

(b) Synthesis of ester-treated solid

After a 100 ml flask equipped with a stirrer, a dropping funnel and a thermometer was substituted with nitrogen, 85 ml of the slurry containing the solid product synthesized in the above (a) was thrown in, furthermore, 26.9 ml of the supernatant was taken out, and the temperature was elevated to 95° C. 6.7 ml(7.0 g, 25 mmol) of diisobutyl phthalate was added and reacted at 95° C. for 30 minutes. After the reaction, the resulting mixture was subjected to solid-liquid separation and washed twice with 59 ml of toluene.

(c) Synthesis of solid catalyst component (activating treatment)

After the end of the washing in the above (b), 13 ml of toluene, 0.56 ml(0.58 ml, 2.1 mmol) of diisobutyl phthalate, 1.0 ml(0.77 g, 5.9 mmol) of di-n-butyl ether and 20 ml(34.6 g, 0.182 mol) of titanium tetrachloride were added to the flask and reacted for 3 hours at 95° C. After the reaction, it was separated at 95° C. by solid-liquid separation and successively, washed twice by 50 ml of toluene at the same temperature. Next, 10 ml of toluene, 1.0 ml(0.77 g, 5.9 mmol) of di-n-butyl ether and 10 ml(17.3 g, 0.09 mol) of titanium tetrachloride were added and reacted for 1 hour at 95° C. After the end of the reaction, it was subjected to solid-liquid separation at the same temperature and successively, after washed three times with 50 ml of toluene at the same temperature, washed three times with 50 ml of hexane and dried further under vacuum to obtain 9.44 g of the solid catalyst component.

In the solid catalyst component, the titanium atom of 1.51% by weight, the phthalate of 5.8% by weight, the ethoxy group of 1.49% by weight and the butoxy group of 0.15% by weight were contained.

(d) Polymerization of propylene

The polymerization of propylene was performed in the same manner as in the polymerization of propylene of Example 1 (d) except using the solid catalyst component obtained in the above (c) of Comparative Example 1.

The PP/Cat was 14,200 (g/g), the CXS was 1.0(wt %) and the bulk density was 0.435 (g/ml). This Comparative Example is more inferior in polymerization activity than the present invention owing not to polymerize with the solid catalyst component of the present invention.

Comparative Example 2

(a) Synthesis of solid catalyst component

The synthesis of the solid catalyst component was conducted as follows in accordance with example 1 described in Japanese Patent Publication (Unexamined) Sho No.58-83006 (1983).

After a 200 ml flask equipped with a stirrer and a thermometer was substituted with nitrogen, 13.2 g of a commercial anhydrous $MgCl_2$, 70 ml of n-decane and 65 ml of 2-ehtylhexanol were thrown in and reacted for 4 hours at 130° C. To the reaction mixture, 3.09 g of phthalic anhydride was further added, and after reacting for 1 hour at 130° C., they were cooled to room temperature. After a 1 liter flask equipped with a stirrer, a dropping funnel and a thermometer was substituted with nitrogen, 560 ml of titanium tetrachloride was thrown in and cooled to −20° C. The whole amount of the obtained reaction solution was thrown into the dropping funnel and gradually dropped in the flask taking 1 hour. After the dropping, the temperature was elevated to room temperature taking 1.25 hours and furthermore, elevated to 110° C. taking 3 hours. To this, 7.8 ml of diisobutyl phthalate was added and reacted for 2 hours at 110° C. After the reaction, the resulting mixture was subjected to solid-liquid separation at the same temperature and 560 ml of titanium tetrachloride was added and reacted for 2 hours at 110° C. After completion of the reaction, thus obtained reaction mixture was subjected to solid-liquid separation at the same temperature, the solid thus obtained was washed five times with 100 ml of LP 20 (manufactured by Idemitsu Petrochemical Company Ltd.) at the same temperature and successively, washed three times with 150 ml of hexane at room temperature and dried under vacuum to obtain 15.78 g of the solid catalyst component. The titanium atom of 1.61% by weight and the phthalate of 4.5% by weight were contained in the solid catalyst component.

(b) Polymerization of propylene

A 3-liter stirring type stainless autoclave was substituted with argon, and 2.6 mmol of triethylaluminum, 0.26 mmol of cyclohexylethyldimethoxysilane and 10.1 mg of the solid catalyst component synthesized in (a) were fed and hydrogen corresponding to a partial pressure of 0.33 kg/cm² was added. Subsequently 780 g of liquid propylene was fed, the temperature of the autoclave was elevated to 80° C. and the polymerization was carried out for 1 hour at 80° C. After the polymerization, an unreacted monomer was purged. The polymer produced was dried under vacuum for 2 hours at 60° C. to obtain 323 g of polypropylene powder. Therefore, the PP/Cat was 32,000 (g/g). The CXS was 1.7 (wt %), and the bulk density of the polymer was 0.42 (g/ml).

What is claimed is:

1. An α-olefin polymerization catalyst consisting essentially of:
(A) a solid catalyst component obtained by
contacting an organosilicon compound selected from the group consisting of organosilicon compounds having an Si—O bond represented by the general formulae:

$Si(OR^1)_m R^2_{4-m}$;

$R^3(R^4_2 SiO)_p SiR^5_3$; and $(R^6_2 SiO)_q$ wherein $R^1$ is a hydrocarbon group having 1 to 20 carbon atoms, each $R^2$, $R^3$, $R^4$, $R^5$ and $R^6$ is a hydrocarbon group having 1 to 20 carbon atoms or a hydrogen atom, m is a number satisfying $0<m \leq 4$, p is an integer of 1 to 1000 and q is an integer of 2 to 1000 with an organomagnesium compound selected from the group consisting of organomagnesium compounds represented by the general formulae:

$R^8 MgX$; and $R^9 R^{10} Mg$ wherein each $R^8$, $R^9$ and $R^{10}$ represents a hydrocarbon group having 1 to 20 carbon atoms and X represents a halogen atom in the presence of m ester of organic acid selected from the group consisting of saturated aliphatic carboxylates, unsaturated aliphatic carboxylates, alicyclic carboxylates and aromatic carboxylates to obtain a solid product, washing the solid product with an inert solvent, treating a washed solid product with an ester of organic acid selected from the group consisting of saturated aliphatic carboxylates, unsaturated aliphatic carboxylates, alicyclic carboxylates and aromatic carboxylates to obtain an ester-treated solid, and treating the ester-treated solid with a mixture of tetravalent-titanium compound represented by the general formula:

$Ti(OR^{11})_g X_{4-}$ wherein $R^{11}$ is a hydrocarbon group having 1 to 20 carbon atoms, X is a halogen atom and g is a number satisfying $0 \leq g < 4$ and an ether compound, or a mixture of the tetravalent-titanium compound, the ether compound and an ester compound;

(B) an organoaluminum compound; and
(C) an electron donative compound.

* * * * *